United States Patent [19]

Van Gelder

[11] Patent Number: 5,123,464
[45] Date of Patent: Jun. 23, 1992

[54] TABLE SAW POWER FEED

[76] Inventor: Harry Van Gelder, 15200 Stagg St., #3, Van Nuys, Calif. 91405

[21] Appl. No.: 718,578

[22] Filed: Jun. 20, 1991

[51] Int. Cl.$^5$ .......................... B27B 31/00; B27C 5/02
[52] U.S. Cl. .................. 144/247; 144/242 C; 144/249 R
[58] Field of Search ................ 83/425, 404, 422, 436; 144/116, 117 R, 129, 242 R, 246 R, 246 D, 249 R, 247, 242 C

[56] References Cited

U.S. PATENT DOCUMENTS

| 5,805 | 3/1874 | Mutty . | |
|---|---|---|---|
| 273,817 | 3/1883 | Chapman . | |
| 328,771 | 10/1885 | Garland et al. | |
| 1,744,875 | 1/1930 | Edwards | 144/249 R |
| 1,818,300 | 8/1931 | Burrows | 144/249 R |
| 2,322,130 | 6/1943 | Kressler | 164/39 |
| 2,687,153 | 8/1954 | Moore | 144/247 |
| 2,907,359 | 10/1959 | Lade | 144/249 R |
| 3,221,583 | 12/1965 | Nicols et al. | 83/163 |
| 3,291,170 | 12/1966 | Nishimura | 144/117 R |
| 3,788,371 | 1/1974 | Mason | 144/312 |
| 4,938,111 | 7/1990 | Masse | 83/425.3 |

Primary Examiner—W. Donald Bray

[57] ABSTRACT

A board pulling device for use with a powered table saw or similar woodworking tool. The puller is readily removable and attachable to most similar tools and uses a novel springing roller to hold the work piece against the pulling roller. The puller is mounted so that it can be moved out of the path of the piece being sawed, or back into place to pull the work piece through the tool. Further, if desired, the entire device is readily removable from the tool.

9 Claims, 2 Drawing Sheets

TABLE SAW POWER FEED

BACKGROUND AND SUMMARY OF THE INVENTION

This invention pertains to devices for pulling boards or similar work pieces through table saws or the like, and more particularly to such a device which is readily attached to the table of the saw or other tool and which is also readily movable out of the path of the board, if desired.

Powered saws and planes for woodworking are frequently mounted on tables across which a board may be pushed through the tool. Such woodworking machines are generally rapidly rotating devices which tend to resist movement of boards through the blades. Therefore, it is necessary to feed the board continuously through the tool.

A number of problems arise from the operation of such a tool. If the feed is too slow, the tool may create enough frictional heat to cause a discoloration of the board at the cut surface. If the board is hand fed, there is a very present danger of a hand slipping or otherwise getting too close to the blade, with resultant severe injury to the hand. If multiple pieces are being cut, constant attention to the piece being worked on is necessary so that it is only after one piece is finished that the next one can be picked up and placed in position. And occasionally, a board or something embedded in the board will be struck by the tool with such force that the piece will be kicked back with possibly severe injuries to an operator who may be standing behind the board.

Various means have been proposed to alleviate these problems. Extra care on the part of the operator including the use of "pushers" for the boards will reduce some of the danger, but that care must be constant with no lapses. Various devices have been proposed to provide a power-assisted feed of boards through the tool. Nearly all of these have been permanently built into the machine so that if the tool was used, the feed was also operated by the same powered device. This sort of solution works well for production equipment where the cut is always in one direction—usually rip-sawing or planing with the grain. However, where a saw is to be used to rip several pieces and then is later to be used to cross cut a few, the pulling device tends to be clumsily in the way, particularly during a cross-out operation.

Many of the devices, particularly the older ones, require that the board be held down manually to create enough friction against a pulling roller to pull the board. That again required that hands be too close to a fast rotating tool with resultant dangers.

By my invention, I provide a device which can be easily moved from a position in which it is used to an out-of-use position. The friction against the pulling roller is created by another spring loaded roller so that there is no increase in sliding friction between the board and the table surface. And the force between the rollers is readily adjustable because of the use of a unique spring loading.

DESCRIPTION

Figure 3:
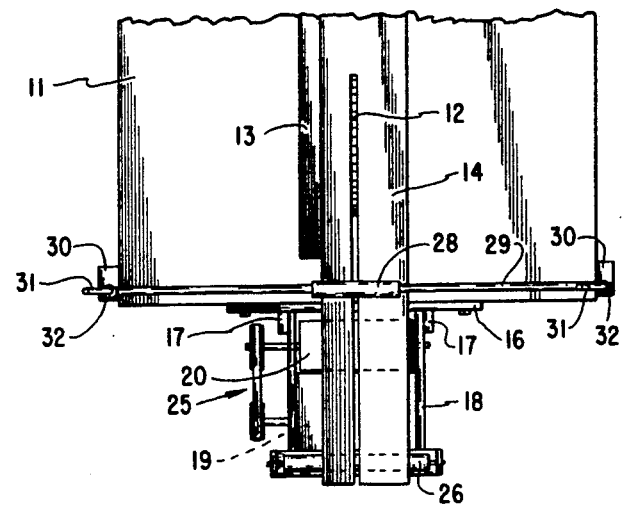
FIG. 3 is a top plan view of the mechanism of FIGS. 1 and 2.

Briefly, my invention comprises a pulling device for pulling a board through a powered wood cutting tool. The pulling device includes a motor driven cylinder adapted to engage frictionally a surface of the board and a spring loaded idler roller engaging the opposite surface to hold the board in frictional engagement with the pulling cylinder. A unique spring system presses the idler into contact, and the entire system is readily disengagable when not in use.

More specifically and referring to the drawings, the device is illustrated in connection with a power saw having a stand 10 supporting a table 11. The saw blade 12 extends through the table and is driven by a motor not shown. A fence 13 provides a guide for material being cut by the saw. It will become apparent that my device could also be used on a planer having a table and rotating blades in approximately the same relative position as the saw blade 12.

Figures 1, 2:
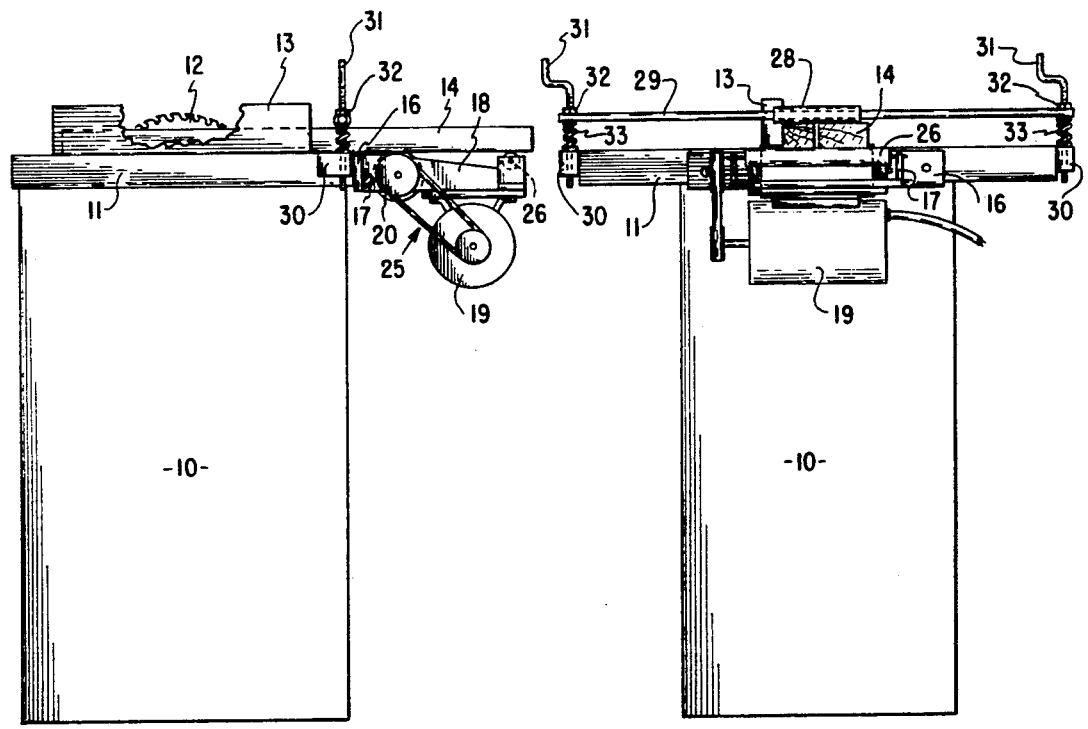
FIG. 1 is a side elevational view of a table saw with my pulling device in position for use.
FIG. 2 is a rear elevational view of the mechanism shown in FIG. 1.
Figure 4:
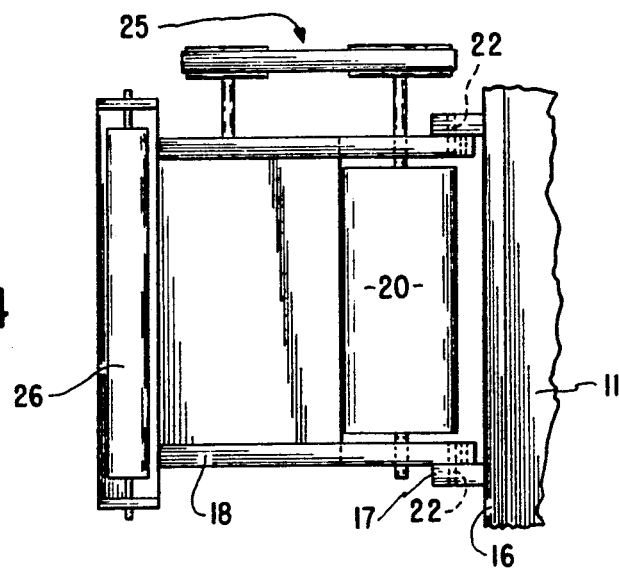
FIG. 4 is a detailed top plan view to an enlarged scale of the pulling device shown in FIGS. 1-3, removed from the basic tool.

Because the device is adapted to pull—rather than push—the work piece 14 through the cutting tool, it should be mounted on the edge at the back of the table towards which the work piece moves as the cutting process takes place. In the figures, this motion is from left to right in FIG. 1; toward the viewer in FIG. 2, and from top to bottom in FIG. 3

Figure 5:
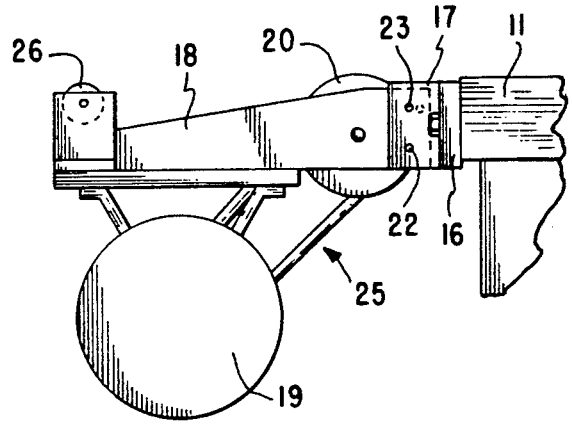
FIG. 5 is a side elevational view of the device shown in FIG. 4.
Figure 6:
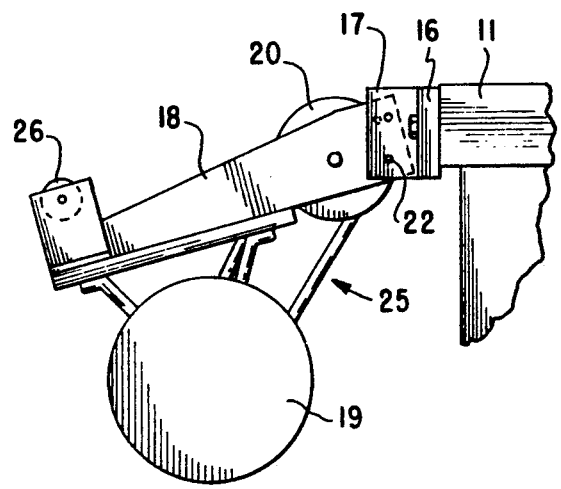
FIG. 6 is a view similar to FIG. 5 showing the puller in a dropped position as when it is not in use.

The device consists of two parts, a powered pulling device and a spring-loaded idler. The pulling part is mounted on a frame 16 simply bolted or fastened by machine screws to the table 11. This frame includes ears 17 extending away from the table 11. A carrier 18 for the motor 19 and the pulling cylinder 20 is pivoted to the ears 17 by a pin 22 or similar device. A second pin 23 may be used to hold the carrier in either of two alternate positions as shown in FIG. 5 and FIG. 6.

The pulling cylinder or drum 20 is journalled in the carrier 18 and is driven through a belt and pulley drive 25 by the motor 19 mounted beneath the carrier. In the use or upper position shown in FIG. 5, the upper surface of the drum 20 is slightly (of the order of ⅛ inch) above the upper surface of the table. The outer surface of this drum may be coated with material designed to increase friction or may be knurled lightly for the same purpose. Its position should be spaced somewhat from the edge of the table for reasons described hereafter.

A support roller 26 may also be journalled on the carrier 18. This latter roller will act as support for the work piece 14 as it comes from the tool, and should therefore be spaced from the pulling drum 20 by a suitable distance.

In order to press the work piece 14 against the drum 20, I provide an idler roller 28 adapted to press downwardly on the work piece. This pressure also tends to hold the piece 14 against the upper surface of the table 11 and, therefore, should be spaced from the drum 20. Because it is preferable to mount the idler near the edge of the table 11, the drum 20 should be spaced a distance of two to four inches from that edge.

The idler 28 includes a unique spring arrangement. The axle 29 on which the idler is journalled extends across the edge of the table and is attached to blocks 30 fastened to the sides of the table near the edge to which the frame 16 is fixed. These blocks include a threaded opening into which threaded cranks 31 extend. The cranks also are freely journalled in holes at each end of the axle 29. A shoulder, illustrated as a nut 32 welded to the crank, is fixed on the crank to restrain the axle from axial movement relative to the crank. It will be apparent that jammed nuts could also be used at this point. A compression spring 33 around each crank 31 and between the table 11 and the axle 29 serves to bias the axle upward so that when the cranks 31 are loosened, the idler roller 28 will be lifted from the work piece.

It is now apparent that by adjusting the threaded position of the cranks 31 relative to the blocks 30, the space between the idler 28 and the surface of the table can be varied to accommodate different thicknesses of work pieces. However, if the axle 29 is formed of a springy material such as a spring steel, finer adjustment of the crank may be used to press the idler 28 onto the work piece 14 pressing it in turn against the top of the table and the upper surface of the pulling drum 19. The bowing of the axle 29 is so slight that it does not interfere effectually with the rolling of the idler, and the pressure may be adequately adjusted to provide sufficient pulling force to cause the work piece 14 to be pulled through the tool.

In use, the cranks 31 are first adjusted to the thickness of the work piece 14 to be cut. The saw or planer is properly set to perform the desired operation; and the power to both units is turned on. The piece is first manually fed through the cutter until it reaches the pulling drum 20. If the pressure on the idler 28 is not properly adjusted, the cranks 31 may then be further adjusted so that the work piece will be pulled through the tool. At that point, the work piece can be released, thus feeding the operator's hands to be removed from danger and to allow that operator to pick up a successive piece if more than one is to be cut. Thus, both safety and production are enhanced.

I claim as my invention:

1. In combination with a cutting tool having a table across which a workpiece may slide past a cutting member, powered pulling means, attachment means engaged between said table and said pulling means, said attachment means being releasably fastened to said table, said pulling means including a power unit, a pulling roller in driven engagement with said power unit, said roller being positioned to engage the underside of said workpiece as said workpiece slides over said table, and idler means attached to said table above said pulling roller and springably engaged with said workpiece whereby said workpiece is pressed against said pulling roller.

2. The pulling device of claim 1 in which said idler means is located so that its plane of engagement with said work piece is spaced between the line of engagement of said pulling roller and the place of engagement of said tool with the work piece.

3. The pulling device of claim 1 in which said attachment means is hinged relative to said table whereby said pulling roller may be dropped out of engagement with said work piece.

4. The pulling device of the claim 1 in which said idler means includes a roller journalled on an axle, said axle extending transversely of the direction of movement of said work piece, mounting brackets fixed to the edges of said table bracketing the edge on which said power unit is mounted, said axle having ends, each of which is adjustably mounted on one said mounting bracket, said axle being formed of springable material whereby said idler can be springably pressed against said work piece.

5. The pulling device of claim 4 in which screw threaded means extend through each end of said axle, said mounting brackets including a threaded hole therein, said threaded means being threadably engaged in said hole whereby the position of said axle relative to the table may be adjusted.

6. The pulling device of claim 3 in which said power unit includes a frame means attachable to said table, carrier means pivotally engaged with said frame means, said pulling roller journalled in said frame, motor means on said frame, power transmitting means engaged between said pulling roller and said motor means to drive said pulling roller.

7. The pulling device of claim 6 in which said motor means is independent of said cutting tool and its driving device.

8. The pulling device of claim 6 in which a support roller is also rotatable mounted on said frame means, said support roller being spaced from said pulling roller in a direction to provide support for said work piece as it moves over said pulling roller.

9. The pulling device of claim 6 in which means is engageable between said frame means and said carrier to define two locations of said carrier, one of said locations being such that the pulling roller is in engagement with said work piece, and the other position in which said pulling roller is below and out of engagement with the work piece.

* * * * *